(12) United States Patent
Breuer et al.

(10) Patent No.: US 9,979,476 B2
(45) Date of Patent: May 22, 2018

(54) TECHNIQUES FOR INDOOR NAVIGATION WITH HAZARD AVOIDANCE VIA LIGHT-BASED COMMUNICATION

(71) Applicant: OSRAM SYLVANIA Inc., Wilmington, MA (US)

(72) Inventors: Christian Breuer, Dortmund (DE); Bernhard Siessegger, Unterschleissheim (DE); Anant Aggarwal, Waltham, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days. days.

(21) Appl. No.: 15/127,478

(22) PCT Filed: Mar. 24, 2015

(86) PCT No.: PCT/US2015/022323
§ 371 (c)(1),
(2) Date: Sep. 20, 2016

(87) PCT Pub. No.: WO2015/148563
PCT Pub. Date: Oct. 1, 2015

(65) Prior Publication Data
US 2017/0180045 A1  Jun. 22, 2017

Related U.S. Application Data

(60) Provisional application No. 61/970,316, filed on Mar. 25, 2014, provisional application No. 61/970,323, filed on Mar. 25, 2014.

(51) Int. Cl.
*H04B 10/116* (2013.01)
*G08B 3/00* (2006.01)
(Continued)

(52) U.S. Cl.
CPC ......... *H04B 10/116* (2013.01); *G01C 21/206* (2013.01); *G01V 1/00* (2013.01);
(Continued)

(58) Field of Classification Search
CPC .. H04B 10/116; H04B 10/502; G01C 21/206; G01V 1/00; G08B 17/00; G08B 1/12
(Continued)

(56) References Cited

U.S. PATENT DOCUMENTS 7,035,650 B1   4/2006  Moskowitz et al.
9,679,449 B2 *  6/2017  Wedig ............. G08B 7/066
(Continued)

FOREIGN PATENT DOCUMENTS

WO   2005/116519 A1   12/2005
WO   2008/148039 A1   12/2008
WO   2013/005122 A1    1/2013

OTHER PUBLICATIONS

Nicolas Vanhaecke, International Search Report and Written Opinion of the International Searching Authority for PCT/US2015/022323, dated Oct. 1, 2015, pp. 1-19, European Patent Office, Rijswijk, The Netherlands.
(Continued)

*Primary Examiner* — Oommen Jacob
(74) *Attorney, Agent, or Firm* — Yutian Ling

(57) ABSTRACT

Techniques are disclosed for enhancing indoor navigation using light-based communication (LCom). In some embodiments, an LCom-enabled luminaire configured as described herein may include or have access to a sensor configured to detect a hazardous condition. In response to detection of a hazard, the LCom-enabled luminaire may adjust its light output, transmit an LCom signal, or both, in accordance with some embodiments. A given LCom signal may include data that may be utilized by a recipient computing device, for
(Continued)

example, in providing emergency evacuation routing or other indoor navigation with hazard avoidance, emergency assistance, or both. In a network of such luminaires, data distribution via inter-luminaire communication may be provided, in accordance with some embodiments, via an optical interface or other wired or wireless communication means. In some cases, the network may include a luminaire that is not LCom-enabled yet still configured for inter-luminaire communication.

17 Claims, 5 Drawing Sheets

(51) Int. Cl.
    *G08B 7/06*         (2006.01)
    *G08B 19/00*      (2006.01)
    *G01C 21/20*      (2006.01)
    *H04B 10/50*      (2013.01)
    *G08B 21/12*      (2006.01)
    *G08B 17/00*      (2006.01)
    *G01V 1/00*       (2006.01)

(52) U.S. Cl.
    CPC .............. *G08B 17/00* (2013.01); *G08B 21/12* (2013.01); *H04B 10/502* (2013.01)

(58) Field of Classification Search
    USPC .................................................. 398/118, 115
    See application file for complete search history.

(56) References Cited

U.S. PATENT DOCUMENTS

| | | | |
|---|---|---|---|
| 2004/0075572 A1* | 4/2004 | Buschmann | G08B 7/066 340/691.1 |
| 2006/0056855 A1 | 3/2006 | Nakagawa et al. | |
| 2006/0146528 A1* | 7/2006 | Montagne | F21S 10/02 362/231 |
| 2008/0281515 A1* | 11/2008 | Ann | G01C 21/20 701/434 |
| 2009/0171571 A1 | 7/2009 | Son et al. | |
| 2010/0164732 A1 | 7/2010 | Wedig et al. | |
| 2013/0162172 A1* | 6/2013 | Baaijens | H05B 33/0863 315/292 |
| 2013/0208184 A1* | 8/2013 | Castor | H04B 10/1149 348/552 |
| 2014/0009274 A1* | 1/2014 | Kohlmeier-Beckmann | A62B 3/00 340/425.5 |
| 2015/0187194 A1* | 7/2015 | Hypolite | G08B 7/06 340/628 |
| 2017/0180045 A1* | 6/2017 | Breuer | H04B 10/116 |

OTHER PUBLICATIONS

Nicolas Vanhaecke, International Search Report and Written Opinion of the International Searching Authority for PCT/US2015/022320, dated Oct. 27, 2015, pp. 1-18, European Patent Office, Rijswijk, The Netherlands.

Nicolas Vanhaecke, International Search Report and Written Opinion of the International Searching Authority for PCT/US2015/022534, dated Oct. 14, 2015, pp. 1-17, European Patent Office, Rijswijk, The Netherlands.

* cited by examiner

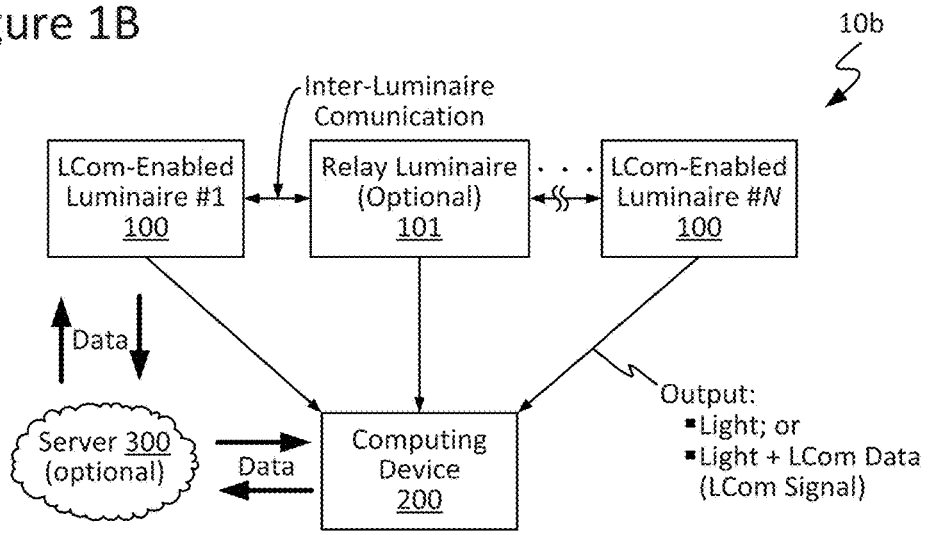
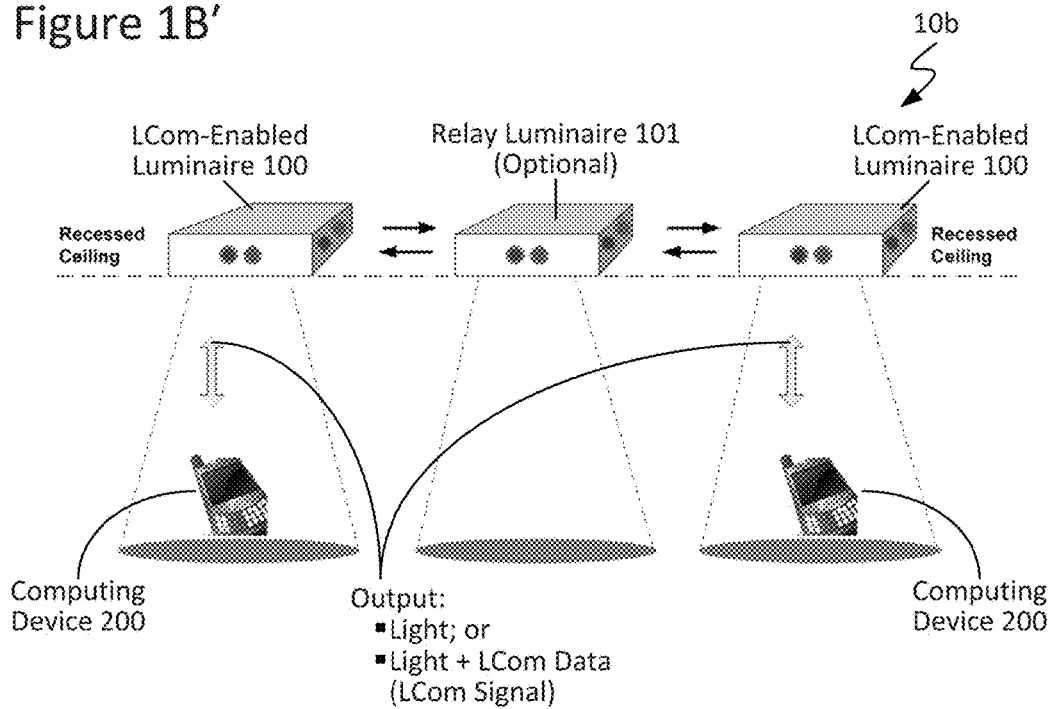

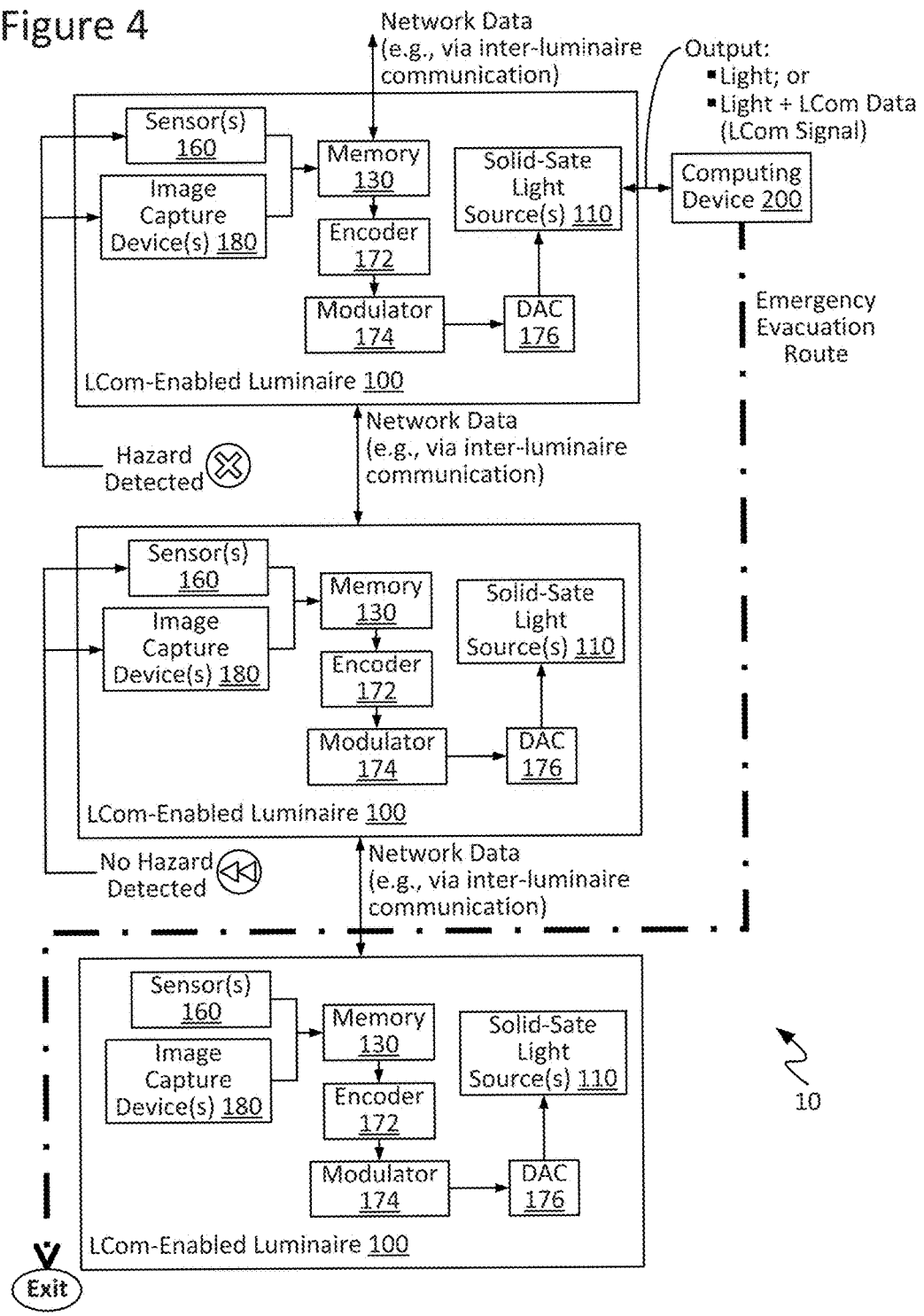

TECHNIQUES FOR INDOOR NAVIGATION WITH HAZARD AVOIDANCE VIA LIGHT-BASED COMMUNICATION

CROSS-REFERENCE TO RELATED APPLICATIONS

This patent application is a National Stage application of, and claims the benefit of, International Application No. PCT/US2015/022323, filed Mar. 24, 2015, which claims the benefit of: U.S. Provisional Patent Application No. 61/970,316, titled "Light Communication Location Tracking," filed on Mar. 25, 2014; and U.S. Provisional Patent Application No. 61/970,323, titled "Light Communication to Occupant," filed on Mar. 25, 2014. Each of these patent applications is herein incorporated by reference in its entirety.

FIELD OF THE DISCLOSURE

The present disclosure relates to solid-state lighting (SSL) and more particularly to light-based communication via SSL.

BACKGROUND

Global positioning system (GPS) devices are commonly used to facilitate navigation on Earth. These GPS devices are designed to communicate with orbiting satellites that transmit location and time information. Closer to the Earth's surface, such satellite-based navigation can be supplemented using local area wireless technologies, such as Wi-Fi, which utilize radio frequency (RF) signals to communicate with nearby compatible devices. These types of wireless technologies typically employ wireless access points (Wi-Fi hotspots) to establish network access, and in cases of secured wireless networks, a password or other security credentials normally must be provided in order to gain network access.

BRIEF DESCRIPTION OF THE DRAWINGS

FIG. 1A' illustrates an example LCom network configured in accordance with an embodiment of the present disclosure.

FIG. 1B is a block diagram illustrating an example LCom network configured in accordance with another embodiment of the present disclosure.

FIG. 1B' illustrates an example LCom network configured in accordance with an embodiment of the present disclosure.

FIG. 4 is a conceptual diagram illustrating an example network of LCom-enabled luminaires providing indoor navigation with hazard avoidance, in accordance with an embodiment of the present disclosure.

Figure 1A:
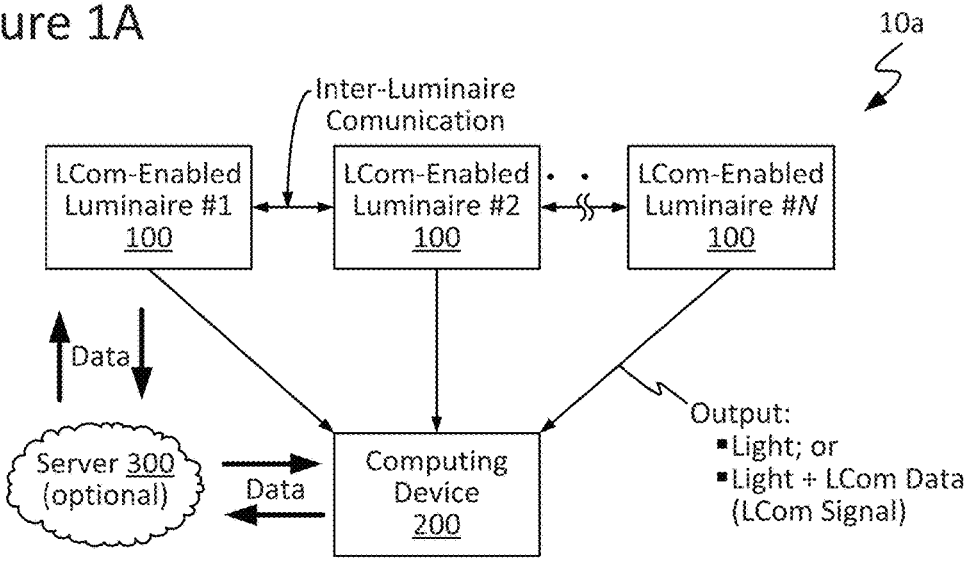
FIG. 1A is a block diagram illustrating an example light-based communication (LCom) network configured in accordance with an embodiment of the present disclosure.
Figure 1A:
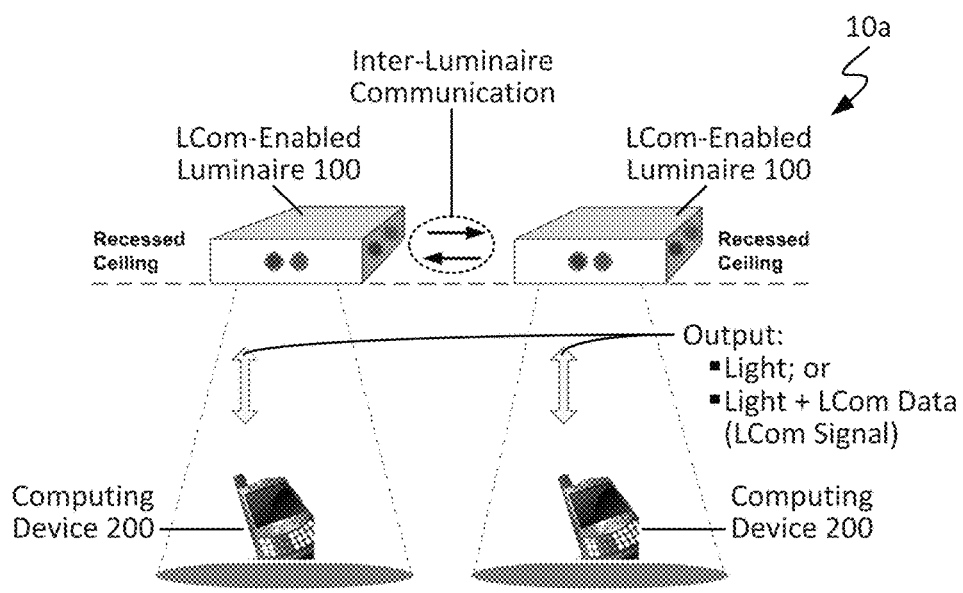

These and other features of the present embodiments will be understood better by reading the following detailed description, taken together with the figures herein described. The accompanying drawings are not intended to be drawn to scale. In the drawings, each identical or nearly identical component that is illustrated in various figures may be represented by a like numeral. For purposes of clarity, not every component may be labeled in every drawing.

DETAILED DESCRIPTION

Techniques are disclosed for enhancing indoor navigation using light-based communication (LCom). In some embodiments, an LCom-enabled luminaire configured as described herein may include or otherwise have access to a sensor configured to detect a given hazardous condition. In response to detection of a hazard, the LCom-enabled luminaire may adjust its light output, transmit an LCom signal, or both, in accordance with some embodiments. A given LCom signal may include data that may be utilized by a recipient computing device, for example, in providing emergency evacuation routing or other indoor navigation with hazard avoidance, emergency assistance, or both. In a network of such luminaires, data distribution via inter-luminaire communication may be provided, in accordance with some embodiments, via an optical interface or other wired or wireless communication means. In some cases, the network may include a luminaire that is not LCom-enabled yet still configured for inter-luminaire communication. Numerous configurations and variations will be apparent in light of this disclosure.

General Overview

Alarm devices such as smoke detectors are typically designed to emit an audible alarm upon detecting the presence of a hazardous condition of interest. Such devices also typically include a small light source that is designed to flash when the alarm is sounded. However, it can be difficult to hear the alarm, and in some cases environmental conditions such as smoke can make it difficult to see the small flashing light, as well as safely navigate to safety. Existing smartphone and mobile computing device-based indoor navigation systems utilize a combination of global positioning system (GPS) and Wi-Fi positioning system (WPS) technologies to provide navigation capabilities. However, these existing GPS-based and Wi-Fi-based techniques suffer from a number of limitations that make their use impractical for indoor navigation, especially in emergency situations. In particular, GPS has an accuracy of only several meters, and the availability and range of Wi-Fi network connections are limited by factors such as the placement of Wi-Fi hotspots, security restrictions imposed by network providers, and other environmental factors. Thus, the combination of GPS and Wi-Fi can fail to achieve sufficiently refined accuracies for purposes of indoor navigation in an emergency context. These complications are compounded by the fact that these existing systems fail to provide evacuation routing information during emergency situations.

Thus, and in accordance with some embodiments of the present disclosure, techniques are disclosed for enhancing indoor navigation using light-based communication. The techniques may be particularly useful, for example, in emergency situations where there is an alarm to warn bystanders of danger or where there are obstacles effectively blocking one or more pathways through a building. As used herein, light-based communication (LCom) generally refers to communication between a solid-state luminaire and a receiver device, such as another solid-state luminaire or a smartphone or other mobile computing device, using a pulsing light signal that is encoded with data. In general, the light utilized in LCom may be of any spectral band, visible or otherwise, and may be of any intensity, as desired for a given target application or end-use. In accordance with some embodiments, a given LCom-enabled luminaire may be configured to transmit a pulsing light signal encoded with data (an LCom signal), and a given receiver device, such as a smartphone or other mobile computing device, may be configured to detect the pulsing light signal encoded with data via one or more light-sensing devices, such as a camera or an ambient light sensor (or both).

In accordance with some embodiments, an LCom-enabled luminaire configured as described herein may include or otherwise have access to a sensor configured to detect a given hazardous condition. In response to detection of a hazard, the LCom-enabled luminaire may adjust its light output, transmit an LCom signal, or both, in accordance with some embodiments. A given LCom signal may include data that may be utilized by a computing device, for example, in providing emergency evacuation routing or other indoor navigation with hazard avoidance, emergency assistance, or both. In a network of such luminaires, data distribution via inter-luminaire communication may be provided, in accordance with some embodiments, via an optical interface or other wired or wireless communication means. In some cases, the network may include a luminaire that is not LCom-enabled yet still configured for inter-luminaire communication.

As will be appreciated in light of this disclosure, techniques disclosed herein can be utilized in any of a wide range of LCom applications and contexts. For example, techniques disclosed herein can be utilized, in accordance with some embodiments, in transmitting location and positioning information between an LCom-enabled luminaire and a receiver device. This information may be utilized, for example, to provide for emergency evacuation routing or other indoor navigation. In some cases, techniques disclosed herein can be utilized as the basis for a positioning and navigation system that may realize improvements in positioning precision and accuracy, for example, over existing GPS-based and WPS-based systems. As such, it follows that techniques disclosed herein can be utilized, in accordance with some embodiments, for safety-related endeavors not possible with existing GPS-based and Wi-Fi-based approaches. More particularly, while the limited accuracy of existing GPS-based and Wi-Fi-based approaches is not sufficient for directing a user to an exit or other safe location within a building, techniques disclosed herein can be utilized, in accordance with some embodiments, to lead a user directly to an exit or other safe location, for example, with hazard avoidance, emergency assistance, or both. Techniques disclosed herein can be utilized, for example, in residential buildings, commercial buildings, or any other structure that may host an LCom-enabled luminaire configured as described herein. Numerous configurations and variations will be apparent in light of this disclosure.

System Architecture and Operation

FIGS. 1A-1A' illustrate an example light-based communication (LCom) network 10a configured in accordance with an embodiment of the present disclosure. FIGS. 1B-1B' illustrate an example LCom network 10b configured in accordance with another embodiment of the present disclosure. For consistency and ease of understanding of the present disclosure, networks 10a and 10b hereinafter may be collectively referred to generally as a network 10, except where separately referenced.

In accordance with some embodiments, network 10 may include one or more LCom-enabled luminaires 100. As discussed herein, a given LCom-enabled luminaire 100 may be configured to output visible light encoded with data (an LCom signal). Using these LCom signals, light-based communication can be provided between an LCom-enabled luminaire 100 of network 10 and a computing device 200, between multiple LCom-enabled luminaires 100 of network 10, or both.

In some embodiments, network 10 also may include one or more solid-state luminaires 101 configured to be utilized in relaying data within network 10. Such solid-state luminaires 101 may be configured substantially the same as a given LCom-enabled luminaire 100 but need not be LCom-enabled. In some cases, a given relay luminaire 101 may be a solid-state luminaire configured as typically done and retrofitted to provide any relay capabilities desired for a given target application or end-use. In any case, a given solid-state luminaire 101 may be considered, in a general sense, a relay or pass-through luminaire within network 10. In a general sense, a given relay luminaire 101 may be effectively transparent to data traffic in the network 10, transmitting any signal received, in some cases unaltered and in real time. When optionally included within network 10, a given relay luminaire 101 may serve to facilitate the relay of information within network 10, in accordance with an embodiment. To such ends, a given relay luminaire 101 may be configured with any of a wide range of capabilities, including those of a transceiver (e.g., receiving and transmitting signals), a repeater (e.g., receiving a signal and passing that same signal downstream), a transponder (e.g., transmitting a particular signal in response to receipt of a particular signal), or a combination thereof.

In some cases, LCom may be provided in only one direction within network 10. For instance, a given LCom-enabled luminaire 100 (transmitter) may transmit an LCom signal to another LCom-enabled luminaire 100 (receiver), a relay luminaire 101, a computing device 200 (receiver), or a combination thereof. In some cases, computing device 200 (transmitter) may transmit an LCom signal to a given LCom-enabled luminaire 100 (receiver). In some other cases, LCom may be provided in multiple directions (e.g., bi-directionally or otherwise multi-directionally) within network 10. For instance, a given LCom-enabled luminaire 100, relay luminaire 101, or computing device 200 (or combination thereof) may act in a transmitting and receiving (e.g., transceiver) capacity.

All or some sub-set of the constituent luminaires 100 and 101 (if optionally included) of network 10 may be configured for communicative coupling with one another. This inter-luminaire communication may be provided in a number of ways. For example, in accordance with some embodiments, a given LCom-enabled luminaire 100 may be configured to communicate with another LCom-enabled luminaire 100 directly, as generally shown with respect to network 10a. In accordance with some other embodiments, a given LCom-enabled luminaire 100 may be configured to communicate with another LCom-enabled luminaire 100 indirectly, for example, through one or more relay luminaires 101, as generally shown with respect to network 10b. In either case, a given luminaire 100 or 101 (if any) may be provided with an optical communication interface, such as a communication module 170 (discussed below), that permits wired or wireless (or both) communication between constituent luminaires of network 10. In some cases, a solid-state luminaire 101 may be retrofitted with a communication module 170 that is configured to provide for inter-luminaire communication with another luminaire 101 or an LCom-enabled luminaire 100 (or both) within network 10. In accordance with some embodiments, all (or some sub-set) of the optical wireless interfaces may use the same data packet structure, regardless of whether the communication exists between an LCom-enabled luminaire 100 and either a computing device 200, a relay luminaire 101, or another LCom-enabled luminaire 100. Each LCom data packet propagated within network 10 may contain information pertaining to the source luminaire, the destination luminaire, or both. LCom data packets may be routed in network 10 based on the spatial mapping and layout of its constituent luminaires 100 and 101 (if any). As discussed below, a given communication module 170 can utilize any of a wide range of wired and wireless communications means, including, for example, a radio frequency (RF) signal, an infrared (IR) signal, or a combination thereof, among others. In some cases, an RF-based backbone may be provided in addition to IR-based luminaire-to-luminaire communication. In this manner, the luminaire-to-luminaire communication may provide a gateway functionality between luminaires connected to different backbones (e.g., between two ZigBee networks, or between a ZigBee and a DALI backbone). Numerous configurations will be apparent in light of this disclosure.

The constituent luminaires 100 and 101 (if any) of network 10 can be arranged as desired. In accordance with an embodiment, the constituent luminaires 100 and 101 (if any) of network 10 may be arranged to provide an unobstructed line of sight (LOS) between luminaires. To that end, in some cases, luminaires 100 and 101 (if any) of network 10 may be positioned above a recessed ceiling or other mounting surface, as generally shown with respect to FIGS. 1A' and 1B'. In some other cases, luminaires 100 and 101 (if any) of network 10 may be positioned on a ceiling or other mounting surface without any intervening structures that otherwise would impede LOS there between. In a more general sense, network 10 may be arranged such that that each constituent luminaire 100 and 101 (if any) has at least one other luminaire in its direct LOS. In some cases, a given luminaire 100 or 101 (if any) may be configured to receive data from or transmit data to (or both) only an immediately neighboring luminaire, LCom-enabled or otherwise.

As will be appreciated in light of this disclosure, selection of the type of transmission means for inter-luminaire communication may be based on considerations pertaining to, for example, line of sight (LOS) availability, latency, data packet loss, immunity to noise interference as wireless bands become increasingly more crowded, expense (e.g., resulting from additional processor, antenna, etc.), and data packaging format and processing, among others. In some cases, use of techniques disclosed herein may provide for inter-luminaire communication without requiring performance of electro-optical translations every time data is received or transmitted. In some cases, use of techniques disclosed herein may provide for inter-luminaire communication in a network including a mixture of LCom-enabled luminaires 100 and traditional solid-state luminaires. Other suitable means for providing inter-luminaire communication will depend on a given application and will be apparent in light of this disclosure.

In accordance with some embodiments, network 10 or computing device 200 (or both) optionally may be configured for communicative coupling with a server 300. Server 300 can be any suitable communication network, public or private. In some instances, server 300 may include a second-generation (2G), a third-generation (3G), or a fourth-generation (4G) mobile communication technology, or a combination of any one or more thereof. In some cases, server 300 may be a private local area network (LAN) operatively coupled to a wide area network (WAN), such as the internet. In some instances, server 300 may include a wireless local area network (WLAN) that utilizes wireless a data communication technology, such as Wi-Fi or Bluetooth, among others. In some cases, server 300 may include supporting infrastructure and functionalities, such as a server and a service provider, but such features are not necessary to carry out communication via server 300. In accordance with some embodiments, server 300 may be configured to provide data to network 10 or to computing device 200 (or both) that can be utilized to supplement data acquired by network 10 (e.g., via a given sensor 160 of a given LCom-enabled luminaire 100, discussed below). In some embodiments, server 300 may be configured to provide data to network 10 or to computing device 200 (or both) that can be used in indoor navigation. For example, server 300 may provide positioning data, identification (ID) data, building layout data, or any other data of interest. Numerous suitable configurations for server 300 will be apparent in light of this disclosure.

Figure 2:
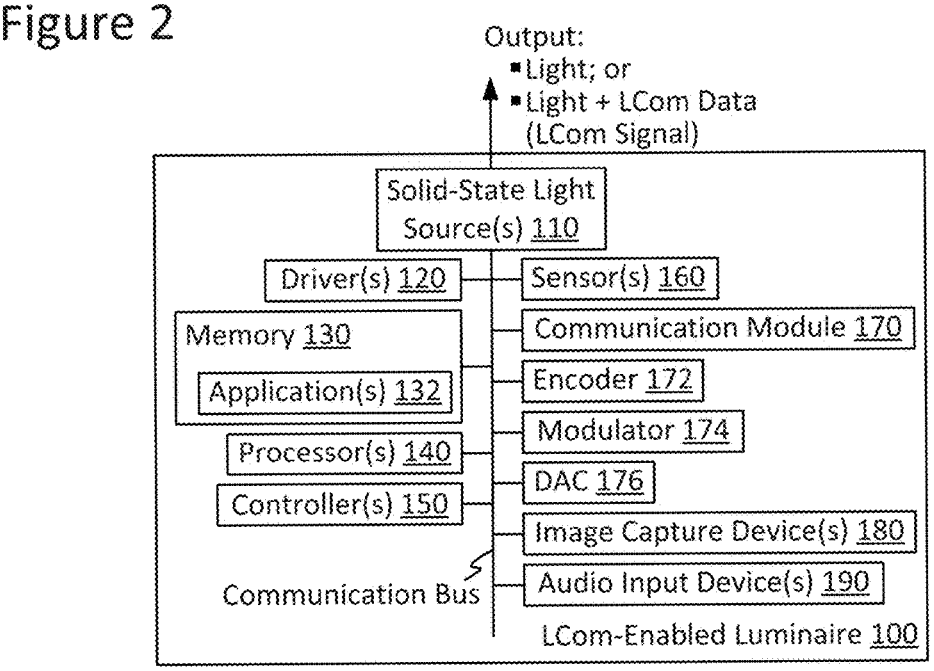
FIG. 2 is a block diagram illustrating an LCom-enabled luminaire configured in accordance with an embodiment of the present disclosure.

FIG. 2 is a block diagram illustrating an LCom-enabled luminaire 100 configured in accordance with an embodiment of the present disclosure. As discussed herein, a given LCom-enabled luminaire 100 may be configured to output light, light encoded with LCom data (e.g., an LCom signal), or both. Transmission of a given LCom signal may be performed at a given transmission rate over a given time interval, as desired for a given target application or end-use. In some cases, a given LCom-enabled luminaire 100 may be configured to repeatedly output its LCom signal(s). In any case, the LCom transmission characteristics of a given LCom-enabled luminaire 100 may be customized, as desired for a given target application or end-use.

In accordance with some embodiments, a given LCom-enabled luminaire 100 may include one or more solid-state light sources 110, the quantity, density, and arrangement of which can be customized, as desired for a given target application or end-use. A given solid-state light source 110 may include one or more solid-state emitters, which may be any semiconductor light source device, such as a light-emitting diode (LED), an organic light-emitting diode (OLED), or a polymer light-emitting diode (PLED), among others. A given solid-state emitter may be configured to emit light from the visible spectral band, the infrared (IR) spectral band, the ultraviolet (UV) spectral band, or any other portion of the electromagnetic spectrum, as desired for a given target application or end-use. In any case, a given solid-state emitter can be packaged or non-packaged, as desired, and in some cases may be populated on a printed circuit board (PCB) or other suitable intermediate or substrate, as will be apparent in light of this disclosure. In some cases, power and control connections for a given solid-state emitter may be routed from a given PCB to a driver 120 (discussed below) or other devices or componentry, as desired.

The emissions characteristics of a given solid-state light source 110 can be customized, as desired for a given target application or end-use. In some cases, a given solid-state light source 110 may be configured for emissions of a single correlated color temperature (CCT). For instance, a given solid-state light source 110 may be a white light-emitting semiconductor light source. In some other cases, however, a given solid-state light source 110 may be configured for color-tunable emissions. For instance, a given solid-state light source 110 may be a bi-color, tri-color, or other multi-color light-emitting semiconductor light source. Some example color combinations include red-green-blue (RGB), red-green-blue-yellow (RGBY), red-green-blue-white (RGBW), and dual-white, among others. In some instances, a given solid-state light source 110 may be a high-brightness semiconductor light source. Other suitable configurations for a given solid-state light source 110 of a given LCom-enabled luminaire 100 will depend on a given application and will be apparent in light of this disclosure.

In accordance with some embodiments, a given solid-state light source 110 also may include one or more optics optically coupled with its solid-state emitter(s). The optic(s) of a given solid-state light source 110 may be configured to transmit the one or more wavelengths of interest of the light emitted by solid-state emitter(s) optically coupled therewith. To that end, the optic(s) may include an optical structure, such as a window, lens, or dome, among others. A given optic may be formed from any suitable optical material, as will be apparent in light of this disclosure. The optic(s) of a given solid-state light source 110 may be formed from a single (e.g., monolithic) piece of optical material to provide a single, continuous optical structure or from multiple pieces of optical material to provide a multi-piece optical structure. Optical features such as an anti-reflective (AR) coating, a reflector, a diffuser, a polarizer, a brightness enhancer, or a phosphor material (e.g., which converts light received thereby to light of a different wavelength), among others, optionally may be included, as desired for a given target application or end-use. Other suitable configurations for the optic(s) of a given solid-state light source 110 will depend on a given application and will be apparent in light of this disclosure.

In accordance with some embodiments, LCom-enabled luminaire 100 may include or otherwise be communicatively coupled with a driver 120 configured for use in electronically driving the solid-state emitter(s) of its solid-state light source(s) 110. Driver 120 may be configured to control the on/off state, dimming level, color of emissions, correlated color temperature (CCT), color saturation of a given solid-state emitter (or grouping of emitters), or a combination of any one or more thereof. To such end, driver 120 may be a single-channel or multi-channel electronic driver and may utilize any suitable driving technique, such as, for example, pulse-width modulation (PWM) dimming, current dimming, constant current reduction (CCR) dimming, triode for alternating current (TRIAC) dimming, pulse-frequency modulation (PFM) dimming, pulse-code modulation (PCM) dimming, or line voltage (mains) dimming (e.g., dimmer is connected before input of driver 120 to adjust AC voltage to driver 120), among others. A given solid-state light source 110 also may include or otherwise be operatively coupled with other solid-state lighting circuitry and componentry, such as power conversion circuitry (e.g., electrical ballast circuitry to convert an AC signal into a DC signal at a desired current and voltage to power a given solid-state light source 110), constant current/voltage driver componentry, transmitter, receiver, or transceiver componentry, and local processing componentry, among others. Other suitable configurations for driver 120 and lighting control and driving techniques will depend on a given application and will be apparent in light of this disclosure.

In accordance with some embodiments, LCom-enabled luminaire 100 may include memory 130. Memory 130 can be random-access memory (RAM), read-only memory (ROM), a combination thereof, or any other suitable memory type. Memory 130 can be implemented with volatile memory, non-volatile memory, or a combination thereof. Memory 130 can be of any size, as desired for a given target application or end-use. In some cases, memory 130 may be configured to be utilized for processor workspace for processor(s) 140 (discussed below). In some cases, memory 130 may be configured for use in storing applications, media, programs, content, or a combination thereof, on a temporary or permanent basis. In some instances, memory 130 may be configured to serve as a cache for data, for example, pertaining to the location of the host LCom-enabled luminaire 100, alert information, advertisements, or any other data of interest. In some cases, memory 130 may serve as a cache for data pertaining to network 10. In some instances, memory 130 may be configured to store data received from optional server 300, destined for optional server 300, or both.

In accordance with some embodiments, memory 130 may have stored therein one or more modules. In accordance with some embodiments, memory 130 may have stored therein or otherwise have access to one or more applications 132. In some instances, a given LCom-enabled luminaire 100 may be configured to receive input, for example, via one or more applications 132 stored in memory 130 (e.g., such as a lighting pattern, LCom data, etc.). A given module of memory 130 can be implemented in any suitable standard, custom, or proprietary programming language, such as, for example, C, C++, objective C, or JavaScript, among others. A given module of memory 130 can be accessed and executed by a given processor 140 of LCom-enabled luminaire 100. In accordance with some embodiments, the module(s) of memory 130 can be encoded, for example, on a computer-readable medium that, when executed by a processor 140, carries out the functionality of a given LCom-enabled luminaire 100, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 130 (e.g., one or more applications 132) can be implemented in hardware, software, firmware, or a combination thereof, as desired for a given target application or end-use. Other suitable modules, applications, and data which may be stored in memory 130 or may be otherwise accessible to a given LCom-enabled luminaire 100 (e.g., via server 300 or elsewhere) will depend on a given application and will be apparent in light of this disclosure.

In accordance with some embodiments, LCom-enabled luminaire 100 may include one or more processors 140, which may be configured as typically done. In accordance with some embodiments, a given processor 140 may be configured to perform operations associated with a given host LCom-enabled luminaire 100. For instance, a given processor 140 may be configured to access and execute a given module within memory 130 or otherwise accessible to LCom-enabled luminaire 100 (e.g., via server 300 or elsewhere). In some cases, a given processor 140 may be configured, for example, to analyze data about a detected hazardous condition and to output data that may be utilized in providing emergency evacuation routing that avoids the detected hazardous condition. In some cases, a given processor 140 may be configured, for example, to analyze data about a detected hazardous condition and to output data that may be utilized in providing emergency evacuation routing that identifies the degree of danger of a given spatial zone along the emergency evacuation route. In some cases, a given processor 140 may be configured, for example, to analyze data about a detected hazardous condition and to output data that may be utilized in providing emergency evacuation routing that identifies or avoids (or both) a potential roadblock to emergency evacuation routing. Other suitable configurations for processor(s) 140 will depend on a given application and will be apparent in light of this disclosure.

In accordance with some embodiments, the one or more solid-state light sources 110 of LCom-enabled luminaire 100 can be electronically controlled to output light, light encoded with LCom data (e.g., an LCom signal), or both. To that end, a given LCom-enabled luminaire 100 may include or otherwise be communicatively coupled with one or more controllers 150. In some embodiments, a given controller 150 may be hosted by LCom-enabled luminaire 100 and operatively coupled with one or more solid-state light sources 110 thereof via a communication bus. In this example case, the controller 150 may output a digital control signal to a given solid-state light source 110 based on input (wired, wireless, or both) received from a given local source such as on-board memory 130, a given remote source such as optional server 300 or a control interface, or both local and remote sources. As a result, a given LCom-enabled luminaire 100 may be controlled in such a manner as to output any number of output beams, which may include light, light encoded with LCom data (e.g., an LCom signal), or both.

The present disclosure is not so limited, however. In some other embodiments, a given controller 150 may be hosted directly, in part or in whole, by a given solid-state light source 110 and operatively coupled with solid-state light source 110 via a communication bus. If LCom-enabled luminaire 100 includes a plurality of such solid-state light sources 110 hosting their own controllers 150, then each such controller 150 may be considered, in a sense, a mini-controller, providing LCom-enabled luminaire 100 with a distributed controller 150. In some such cases, a given controller 150 may be populated, for example, on a given PCB of the host solid-state light source 110. In this example case, a given controller 150 may output a digital control signal to an associated solid-state light source 110 based on input (wired, wireless, or both) received from a given local source such as on-board memory 130, a given remote source such as an optional server 300 or control interface, or both local and remote sources. As a result, a given LCom-enabled luminaire 110 may be controlled in such a manner as to output any number of output beams, which may include light, light encoded with LCom data (e.g., an LCom signal), or both.

In accordance with some embodiments, a given controller 150 may host one or more lighting control modules and can be programmed or otherwise configured to output one or more control signals to adjust the operation of the solid-state emitter(s) of a given solid-state light source 110. In some cases, a given controller 150 may be configured to output a control signal to control whether the light beam of a given solid-state emitter is on/off. In some instances, a given controller 150 may be configured to output a control signal to increase the intensity (brighten), decrease the intensity (dim), or otherwise control the intensity of the light emitted by a given solid-state emitter. In some cases, a given controller 150 may be configured to output a control signal to mix, tune, or otherwise control the color of the light emitted by a given solid-state emitter. Thus, if a given solid-state light source 110 includes two or more solid-state emitters configured to emit light having different wavelengths, the control signal may be used to adjust the relative brightness of the different solid-state emitters in order to change the mixed color output by that solid-state light source 110. In some embodiments, a given controller 150 may be configured to output a control signal to encoder 172 (discussed below) to facilitate encoding of LCom data for transmission by a given LCom-enabled luminaire 100. In some embodiments, a given controller 150 may be configured to output a control signal to modulator 174 (discussed below) to facilitate modulation of an LCom signal for transmission by a given LCom-enabled luminaire 100. Other suitable configurations and output for a given controller 150 of a given LCom-enabled luminaire 100 will depend on a given application and will be apparent in light of this disclosure.

In accordance with some embodiments, a given LCom-enabled luminaire 100 may include or otherwise be communicatively coupled with one or more sensors 160. A given sensor 160 may be configured to detect a given stimulus, such as a dangerous or otherwise hazardous condition, and to output a signal including data pertaining to that stimulus. For instance, in some cases, a given sensor 160 may be configured to detect smoke, fire, or both. In some cases, a given sensor 160 may be configured to detect toxic or otherwise hazardous air quality, for example, as may be caused by the presence of carbon monoxide or other hazardous substance. In some cases, a given sensor 160 may be configured to detect seismic vibrations, for example, as may be caused by an earthquake. Additional and different types of sensors 160 may be provided, as desired for a given target application or end-use.

A given sensor 160 may be configured to provide its output signal to its associated LCom-enabled luminaire 100. In some embodiments, a given sensor 160 may be on-board, built-in, or otherwise integrated with a given LCom-enabled luminaire 100. In some other embodiments, a given sensor 160 may be separate from but communicatively coupled with a given LCom-enabled luminaire 100. In any case, a given sensor 160 may include mechanical componentry, solid-state componentry, or both. A given sensor 160 may be configured to perform detection sampling as frequently as desired, and in some cases may do so in real time. In addition, the area monitored by a given sensor 160 may be customized as desired, and in some cases may be made to substantially cover the spatial region to be illuminated by the light output of its associated LCom-enabled luminaire 100. Other suitable configurations for a given sensor 160 will depend on a given application and will be apparent in light of this disclosure.

In accordance with some embodiments, a given LCom-enabled luminaire 100 may include a communication module 170 configured to facilitate communication with another LCom-enabled luminaire 100, a relay luminaire 101 (if optionally present in network 10), a computing device 200, or a combination thereof. In some cases, communication module 170 may facilitate inter-luminaire communication directly between LCom-enabled luminaires 100, as generally shown with respect to network 10a in FIGS. 1A-1A'. In some other cases, communication module 170 may facilitate inter-luminaire communication indirectly between LCom-enabled luminaires 100 through one or more relay luminaires 101, as generally shown with respect to network 10b in FIGS. 1B-1B'. To such ends, communication module 170 may be configured to use any suitable communications means, such as radio frequency (RF) transmissions or infrared (IR) light modulation, among others. In some cases, communication module 170 may be configured for wired communication, for example, via Universal Serial Bus (USB), Ethernet, or FireWire, among others. In some cases, communication module 170 may be configured for wireless communication, for example, via Wi-Fi or Bluetooth, among others. In some instances, communication module 170 may be configured for a combination of wired and wireless communications. In a more general sense, communication module 170 may be configured to communicate utilizing any standard, custom, or proprietary communication protocol, such as, for example, a digital multiplexer (DMX) interface protocol, a Wi-Fi protocol, a Bluetooth protocol, a digital addressable lighting interface (DALI) protocol, a ZigBee protocol, or a combination thereof, among others. Other suitable configurations and wired and wireless communication means for communication module 170 will depend on a given application and will be apparent in light of this disclosure.

In accordance with some embodiments, the communication module 170 of a given LCom-enabled luminaire 100 (or solid-state luminaire 101, discussed above) may include a given quantity and arrangement of infrared (IR) transmitters and receivers. In an example case, a given luminaire 100 or 101 (if any) may be configured such that each side or other surface thereof includes both an IR transmitter channel and an IR receiver channel. Inter-luminaire communication via an optical (e.g., IR) wireless link may provide for low latency, in some cases providing real-time performance, for network 10. In some cases, use of optical wireless interfacing techniques described herein may allow for bi-directional communication (e.g., transmission and reception) over a single channel between any two luminaires, LCom-enabled or otherwise. In some cases, use of optical wireless interfacing techniques described herein may provide for low communication overhead, reduced data packet size, or both. More particularly, the same data packets as are used in LCom may be utilized in inter-luminaire communication, and thus no extra packet creation, interpretation, or integrity checks may be needed, in accordance with an embodiment. In some instances, LCom functionality and relay functionality (e.g., transceiver, repeater, transponder) within network 10 may share the same hardware abstraction layer (HAL). More particularly, the same HAL may be used regardless of whether the communication is between an LCom-enabled luminaire 100 and a computing device 200 or between two neighboring luminaires, LCom-enabled or otherwise. As will be appreciated in light of this disclosure, this may lead to lower computational and hardware requirements. In some cases, use of inter-luminaire communication techniques described herein may realize a reduction in system cost and hardware complexity as compared to existing approaches to communication techniques.

In accordance with some embodiments, LCom-enabled luminaire 100 may include an encoder 172, a modulator 174, and a digital-to-analog converter (DAC) 176. Encoder 172 may be configured to encode LCom data in preparation for transmission thereof by a host LCom-enabled luminaire 100. To that end, encoder 172 may be any suitable digital encoder configured as typically done. Modulator 174 may be configured to modulate an LCom signal in preparation for transmission thereof by the host LCom-enabled luminaire 100. Modulator 174 may be a single-channel or multichannel electronic driver (e.g., such as driver 120) configured, for example, for use in controlling the output of the one or more solid-state emitters of a given solid-state light source 110. In some embodiments, modulator 174 may be configured to control the on/off state, dimming level, color of emissions, correlated color temperature (CCT), color saturation of a given solid-state emitter (or grouping of emitters), or a combination of any one or more thereof. To such end, modulator 174 may utilize any of the example driving techniques discussed above, for example, with respect to driver 120. DAC 176 may be configured to convert a digital control signal into an analog control signal to be applied to a given solid-state light source 110 of the host LCom-enabled luminaire 100 to output an LCom signal therefrom. To such end, DAC 176 may be any suitable digital-to-analog converter any may be configured as typically done. Other suitable configurations for encoder 172, modulator 174, and DAC 176 will depend on a given application and will be apparent in light of this disclosure.

In accordance with some embodiments, LCom-enabled luminaire 100 may include or otherwise be communicatively coupled with one or more image capture devices 180. A given image capture device 180 can be any device configured to capture digital images, such as a still camera (e.g., a camera configured to capture still photographs) or a video camera (e.g., a camera configured to capture moving images comprising a plurality of frames). In some cases, a given image capture device 180 may include components such as, for instance, an optics assembly, an image sensor, an image encoder, a video encoder, or a combination of any one or more thereof. In some embodiments, a given image capture device 180 may be on-board, built-in, or otherwise integrated with a given LCom-enabled luminaire 100. In some other embodiments, a given image capture device 180 may be separate from but communicatively coupled with a given LCom-enabled luminaire 100. Components of a given image capture device 180 may be implemented in hardware, software, firmware, or a combination of any one or more thereof. A given image capture device 180 can be configured to detect electromagnetic radiation (e.g., light), for example, from the visible spectral band, the infrared (IR) spectral band, the ultraviolet (UV) spectral band, or any other portion of the electromagnetic spectrum, as desired for a given target application or end-use. In some instances, a given image capture device 180 may be configured to continuously acquire imaging data. In some other instances, a given image capture device 180 may be configured to acquire imaging data upon detection of light that exceeds a luminous intensity level threshold or duration threshold (or both), which can be set at any standard or custom value, and in some cases may be user-configurable. In some other instances, a given image capture device 180 may be configured to acquire imaging data at periodic intervals, user-configurable intervals, or otherwise as frequently as desired for a given target application or end-use. As described herein, a given image capture device 180 may be configured, in accordance with some embodiments, to detect a hazardous condition and output a signal regarding such stimulus to an associated LCom-enabled luminaire 100. Other suitable configurations for a given image capture device 180 will depend on a given application and will be apparent in light of this disclosure.

In accordance with some embodiments, LCom-enabled luminaire 100 may include or otherwise be communicatively coupled with one or more audio input devices 190. A given audio input device 190 can be any device configured to detect sound, audible or otherwise. In some embodiments, a given audio input device 190 may be a microphone configured as typically done. Components of a given audio input device 190 may be implemented in hardware, software, firmware, or a combination of any one or more thereof. In some instances, a given audio input device 190 may be configured to continuously acquire audio data. In some other instances, a given audio input device 190 may be configured to acquire audio data upon detection of a sound that exceeds a volume level threshold or duration threshold (or both), which can be set at any standard or custom value, and in some cases may be user-configurable. In some other instances, a given audio input device 190 may be configured to acquire audio data at periodic intervals, user-configurable intervals, or otherwise as frequently as desired for a given target application or end-use. Other suitable configurations for a given audio input device 190 will depend on a given application and will be apparent in light of this disclosure.

Figure 3:
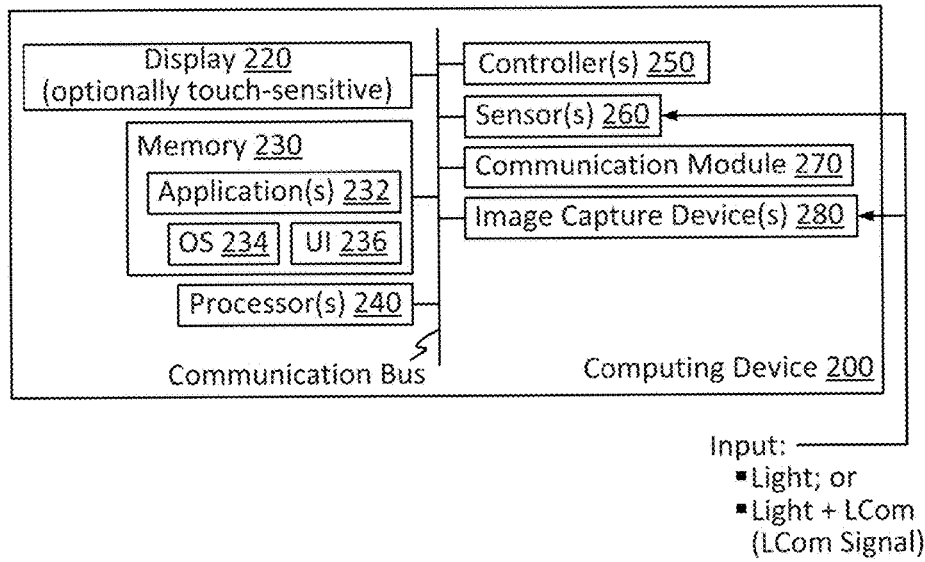
FIG. 3 is a block diagram illustrating a computing device configured in accordance with an embodiment of the present disclosure.

FIG. 3 is a block diagram illustrating a computing device 200 configured in accordance with an embodiment of the present disclosure. As discussed herein, computing device 200 may be configured to detect the light pulses of an LCom signal emitted by a transmitting LCom-enabled luminaire 100 and decode LCom data from a detected LCom signal. To such ends, computing device 200 can be any of a wide range of computing platforms, mobile or otherwise. For example, computing device 200 can be, in part or in whole, a laptop computer, notebook computer, sub-notebook computer, tablet computer, phablet computer, mobile phone, smartphone, personal digital assistant (PDA), portable media player (PMP), cellular handset, handheld gaming device, gaming platform, desktop computer, television set, wearable or otherwise body-borne computing device, such as a smartwatch, smart glasses, or smart headgear, or a combination of any one or more of the aforementioned. Other suitable configurations for computing device 200 will depend on a given application and will be apparent in light of this disclosure.

In accordance with some embodiments, computing device 200 may include memory 230. Memory 230 may be provided with any of the example configurations discussed above, for example, with respect to memory 130. In some cases, memory 230 may be configured to be utilized for processor workspace for processor(s) 240 (discussed below). In some cases, memory 230 may be configured for use in storing applications, media, programs, content, or a combination thereof, on a temporary or permanent basis. In some instances, memory 230 may be configured to serve as a cache for data, for example, pertaining to the location of the host computing device 200, alert information, advertisements, or any other data of interest. In some cases, memory 230 may serve as a cache for data pertaining to network 10. In some instances, memory 230 may be configured to store data received from optional server 300, destined for optional server 300, or both.

In accordance with some embodiments, memory 230 may have stored therein one or more modules. In accordance with some embodiments, memory 230 may have stored therein or otherwise have access to one or more applications 232. In some instances, computing device 200 may be configured to receive input, for example, via one or more applications 232 stored in memory 230. For instance, in accordance with some embodiments, memory 230 may have one or more applications 232 stored therein or otherwise accessible thereto. In an example case, memory 230 may have an indoor navigation application stored therein. In another example case, memory 230 may have stored therein an application for computing an emergency evacuation route with respect to a building or other structure. A given module of memory 230 can be implemented in any suitable standard, custom, or proprietary programming language, such as, for example, C, C++, objective C, or JavaScript, among others. A given module of memory 230 can be accessed and executed by a given processor 240 of computing device 200. In accordance with some embodiments, the module(s) of memory 230 can be encoded, for example, on a computer-readable medium that, when executed by a processor 240, carries out the functionality of computing device 200, in part or in whole. The computer-readable medium may be, for example, a hard drive, a compact disk, a memory stick, a server, or any other suitable non-transitory computer or computing device memory that includes executable instructions, or a plurality or combination of such memories. Other embodiments can be implemented, for instance, with gate-level logic or an application-specific integrated circuit (ASIC) or chip set, or other such purpose-built logic. Some embodiments can be implemented with a microcontroller having input/output (I/O) capability (e.g., inputs for receiving user inputs; outputs for directing other components) and a number of embedded routines for carrying out device functionality. In a more general sense, the functional module(s) of memory 230 (e.g., one or more applications 232) can be implemented in hardware, software, firmware, or a combination thereof, as desired for a given target application or end-use.

In accordance with some embodiments, memory 230 may have an operating system (OS) 234 stored therein or otherwise accessible thereto. OS 234 can be implemented with any suitable OS, mobile or otherwise, such as Android OS from Google, Inc., iOS from Apple, Inc., BlackBerry OS from BlackBerry Ltd., Windows Phone OS from Microsoft Corp., Palm OS/Garnet OS from Palm, Inc., or an open source OS such as Symbian OS, among others. OS 234 may be configured to aid in processing LCom data during its flow through computing device 200.

In accordance with some embodiments, memory 230 may have a user interface (UI) 236 stored therein or otherwise accessible thereto. In some cases, UI 236 of computing device 200 may be implemented in memory 230. In some other cases, UI 236 of computing device 200 may be implemented in a combination of locations, such as in memory 230 and at display 220 (discussed below), thereby providing UI 236 with a given degree of functional distributedness. UI 236 may be configured to present a graphical UI (GUI) at display 220 that aids in carrying out any of the various LCom-related techniques discussed herein. Other suitable modules (e.g., applications 232, OS 234, UI 236) and data that may be stored in memory 230 or otherwise accessible to computing device 200 (e.g., via server 300 or elsewhere) will depend on a given application and will be apparent in light of this disclosure.

In accordance with some embodiments, computing device 200 may include one or more processors 240, which may be configured as typically done. In accordance with some embodiments, a given processor 240 may be configured to perform operations associated with computing device 200. For instance, a given processor 240 may be configured to access and execute a given module within memory 230 or otherwise accessible to computing device 200 (e.g., via server 300 or elsewhere). Other suitable configurations for processor(s) 240 will depend on a given application and will be apparent in light of this disclosure.

In accordance with some embodiments, computing device 200 may include a display 220. Display 220 can be any electronic visual display or other display device configured to generate an image, video, text, or other displayable content there at. In some instances, display 220 may be integrated, in part or in whole, with computing device 200. In some other instances, display 220 may be a stand-alone component configured to be communicatively coupled with computing device 200 using any suitable communication means, wired or wireless (or both). Display 220 optionally may be a touchscreen display or other touch-sensitive display and can be configured as typically done to that end. In such cases, optionally touch-sensitive display 220 generally may be configured to detect or otherwise sense direct, proximate, or other contact from a user's finger, stylus, or other suitable implement at a given location of that display 220. Optionally touch-sensitive display 220 may be configured to translate such contact into an electronic signal that can be processed by computing device 200 (e.g., by the one or more processors 240 thereof) and manipulated or otherwise used to trigger a given GUI action. When included, optional touch-sensitive display 220 may facilitate user interaction with computing device 200 via the GUI presented by such display 220. Other suitable configurations for display 220 will depend on a given application and will be apparent in light of this disclosure.

In accordance with some embodiments, computing device 200 may include or otherwise be communicatively coupled with one or more controllers 250. A given controller 250 may be configured to output one or more control signals to control any one or more of the various components and modules of computing device 200 and may do so, for example, based on input (wired, wireless, or both) received from a given local source such as on-board memory 230, a given remote source such as optional server 300 or a control interface, or both local and remote sources. In accordance with some embodiments, a given controller 250 may host one or more control modules and can be programmed or otherwise configured to output one or more control signals to adjust the operation of computing device 200, in part or in whole. In some cases, a given controller 250 may be configured to output a control signal to control operation of a given sensor 260 (discussed below). In some cases, a given controller 250 may be configured to output a control signal to control operation of a given image capture device 280 (discussed below). Other suitable configurations and output for a given controller 250 will depend on a given application and will be apparent in light of this disclosure.

In accordance with some embodiments, computing device 200 may include or otherwise be communicatively coupled with one or more sensors 260. For example, computing device 200 optionally may include an ambient light sensor configured to detect ambient light levels (e.g., of the surrounding environment of computing device 200) and output a signal including data pertaining to that stimulus. In some cases, such ambient light sensor may be configured to detect LCom signal output of a transmitting LCom-enabled luminaire 100. Additional and different types of sensors 260 may be provided, as desired for a given target application or end-use.

A given sensor 260 may be configured to provide its output signal to its associated computing device 200. In some embodiments, a given sensor 260 may be on-board, built-in, or otherwise integrated with computing device 200. In some other embodiments, a given sensor 260 may be separate from but communicatively coupled with computing device 200. In any case, a given sensor 260 may include mechanical componentry, solid-state componentry, or both. A given sensor 260 may be configured to perform detection sampling as frequently as desired, and in some cases may do so in real time. Other suitable configurations for a given sensor 260 will depend on a given application and will be apparent in light of this disclosure.

In accordance with some embodiments, computing device 200 may include a communication module 270 configured to facilitate communication with a given LCom-enabled luminaire 100, another computing device 200, or an optional network 300, or a combination thereof. To such ends, communication module 270 may be configured to utilize any of the example communications means and transmission technologies and protocols discussed above, for instance, with respect to communication module 170. In some cases, communication module 270 may be configured to utilize a near field communication (NFC) protocol, a local area network (LAN)-based communication protocol, a cellular-based communication protocol, an Internet-based communication protocol, a satellite-based communication protocol, or a combination thereof. In some cases, communication module 270 of computing device 200 and communication module 170 of a given LCom-enabled luminaire 100 may be configured to utilize the same communications means. Other suitable configurations and wired and wireless communication means for communication module 270 will depend on a given application and will be apparent in light of this disclosure.

In accordance with some embodiments, computing device 200 may include or otherwise be communicatively coupled with one or more image capture devices 280, such as a front-facing image capture device, a rear-facing image capture device, or both. A given image capture device 280 may be provided with any of the example configurations discussed above, for instance, with respect to image capture device 180. In some instances, a given image capture device 280 may be, for example, a camera like one typically found in smartphones or other mobile computing devices. In some embodiments, a given image capture device 280 may be on-board, built-in, or otherwise integrated with computing device 200. In some other embodiments, a given image capture device 280 may be separate from but communicatively coupled with computing device 200. Components of a given image capture device 280 may be implemented in hardware, software, firmware, or a combination of any one or more thereof. In some instances, a given image capture device 280 may be configured to continuously acquire imaging data. In some other instances, a given image capture device 280 may be configured to acquire imaging data upon detection of light that exceeds a luminous intensity level threshold or duration threshold (or both), which can be set at any standard or custom value, and in some cases may be user-configurable. In some other instances, a given image capture device 280 may be configured to acquire imaging data at periodic intervals, user-configurable intervals, or otherwise as frequently as desired for a given target application or end-use. As described herein, a given image capture device 280 of computing device 200 may be configured to detect LCom signal output of a transmitting LCom-enabled luminaire 100. Other suitable configurations for a given image capture device 280 will depend on a given application and will be apparent in light of this disclosure.

Indoor Navigation with Hazard Avoidance

As discussed above, a given LCom-enabled luminaire 100 of network 10 may include or otherwise be communicatively coupled with a sensor 160, an image capture device 180, or both. Also, as discussed above, such components may be utilized, for example, to detect any of a wide range of stimuli that may signify the presence of a given hazardous condition. Thus, in accordance with some embodiments, a network 10 of LCom-enabled luminaires 100 may be utilized to provide indoor navigation with hazard avoidance. In some cases, use of techniques disclosed herein may provide a user with locational awareness in terms of hazardous conditions that are roadblocks to safely evacuating to an exit or other safe location in a building.

FIG. 4 is a conceptual diagram illustrating an example network 10 of LCom-enabled luminaires 100 providing indoor navigation with hazard avoidance, in accordance with an embodiment of the present disclosure. As can be seen, a given LCom-enabled luminaire 100 of network 10 may detect a hazard. Hazard detection may be performed by a sensor 160 or an image capture device 180 (or both) included with or otherwise communicatively coupled with a given LCom-enabled luminaire 100 of network 10. The triggered sensor 160 or image capture device 180 (or both) may transmit data pertaining to the detected hazard to memory 130 of the LCom-enabled luminaire 100 associated therewith. In some cases, that data may be encoded via encoder 172, modulated via modulator 174, and converted from a digital signal to an analog signal via DAC 176. The resultant analog signal encoded with data pertaining to the detected hazard may be provided to a given solid-state light source 110 of the LCom-enabled luminaire 100 and transmitted thereby as an LCom signal. The LCom signal may be detected and decoded by a local computing device 200 via a sensor 260 (e.g., such as an ambient light sensor), an image capture device 280, or both.

In some cases, data pertaining to a detected hazard may be relayed or otherwise disseminated within network 10. In some instances, data about the detected hazard may be transmitted directly or indirectly to another LCom-enabled luminaire 100 through one or more intermediate relay luminaires 101 (or both directly and indirectly). Thus, alerts and other information relevant to emergency evacuation routing may be forwarded from one portion of network 10 to another portion thereof to facilitate indoor navigation. In any case, upon receipt of data pertaining to a detected hazard, a given LCom-enabled luminaire 100 may transmit an LCom signal including that data, which in turn may be detected and decoded by a local computing device 200, as described above.

Depending on the configuration of network 10, LCom signal transmission may be provided by a single LCom-enabled luminaire 100 or by multiple LCom-enabled luminaires 100 transmitting individually or simultaneously, as desired. Network 10 may provide LCom signal transmissions as frequently as desired, and in some cases may provide them in real time.

In accordance with some embodiments, LCom data received by computing device 200 may be utilized to provide indoor navigation with hazard avoidance. To that end, computing device 200 may utilize LCom data received via an LCom signal in computing an emergency evacuation route that avoids a roadblock or other hazardous condition and that may be followed by the user to navigate to an exit or other safe location. In some instances, such computation may be performed, at least in part, via an application 232 on or otherwise accessible to computing device 200. The resultant emergency evacuation routing information may be provided to a user via UI 236 (e.g., a GUI) presented at display 220.

The LCom signal transmitted by a given LCom-enabled luminaire 100 may include any of a wide range of data that may be utilized in providing indoor navigation with hazard avoidance. For example, in some cases, a given LCom signal transmitted by network 10 may include data pertaining to a hazardous condition detected by a given sensor 160, a given image capture device 180, or a combination thereof. In some such cases, information pertaining to the degree of danger of a given spatial zone along an emergency evacuation route may be included. In some other such cases, information pertaining to so-called "roadblock" (e.g., impassable) conditions such as a non-operational elevator or other obstacle that may not be apparent from a building or safety map may be included in a transmitted LCom signal. In some still other such cases, information pertaining to a navigation map update may be included in a transmitted LCom signal. In some instances, a given LCom signal transmitted by network 10 may include data pertaining to the ID and location of a given LCom-enabled luminaire 100 transmitting the LCom signal. In some cases, a given LCom signal transmitted by network 10 may include data pertaining to the current positioning of computing device 200. In some instances, a given LCom signal transmitted by network 10 may include data pertaining to an advertisement or other alert. It should be noted, however, that the present disclosure is not so limited only to these examples, as in a more general sense, network 10 may be configured to transmit data pertaining to any condition of interest in providing emergency evacuation routing or other indoor navigation. In any case, such data may be utilized, for example, in identifying and avoiding a given hazardous condition.

In some cases, computation of emergency evacuation routing by computing device 200 may utilize data provided by some source outside of network 10, such as, for example, a building management system (BMS), a Wi-Fi positioning system (WPS), or a global positioning system (GPS), among others. Such supplemental data may pertain to detected hazards, positioning, identification, alerts, advertisements, or any other desired information. When optionally provided, such supplemental data may be received by computing device 200 directly (e.g., via communication module 270), indirectly via a given LCom-enabled luminaire 100, or both.

In accordance with some embodiments, emergency evacuation routing may be updated based on data received from network 10, a supplemental source, or both. Indoor navigation updates may be provided as frequently as desired, and in some cases may be provided in real time. Such updates may be provided with or without a pre-loaded evacuation map or other building layout, as desired. In accordance with some embodiments, indoor navigation information and other data acquired in real-time may be transmitted to computing device 200 via one or more LCom signals.

Consider the example case where a localized indoor fire is detected by a sensor 160 of a given LCom-enabled luminaire 100 within network 10. The triggered sensor 160 provides data about the detected hazard to the associated LCom-enabled luminaire 100, which transmits an LCom signal containing LCom data pertaining to the detected hazard, as well as relays data to another LCom-enabled luminaire 100 or relay luminaire 101 (or both) within network 10. Computing device 200 detects and decodes any received LCom signal, utilizing data pertaining to the detected hazard to provide a user with indoor navigation information that may be used to safely navigate to an exit or other safe location. The emergency evacuation route may be routed through areas unaffected by the detected hazard. If an area along the emergency evacuation route becomes unsafe, network 10 may detect the change and relay the new information to computing device 200 to update the indoor navigation information presented.

Indoor Navigation with Emergency Assistance

As discussed above, a given LCom-enabled luminaire 100 of network 10 may include or otherwise be communicatively coupled with a sensor 160, an audio input device 190, or both. Also, as discussed above, such components may be utilized, for example, to detect any of a wide range of stimuli that may signify the presence of a given hazardous condition. In addition, a given LCom-enabled luminaire 100 may include a communication module 170, as discussed above. Thus, in accordance with some embodiments, an LCom-enabled luminaire 100 may be utilized to provide indoor navigation with emergency assistance. In some cases, techniques disclosed herein may be used to provide a visible clue that visually alerts a bystander to the detection of a hazardous condition in the building. In some cases, techniques disclosed herein may be used to provide a visible clue that facilitates indoor navigation along an emergency evacuation route to an exit or other safe location. In some cases, techniques disclosed herein may be used to automatically initiate communication with an emergency contact upon hazard detection.

Figure 5A:
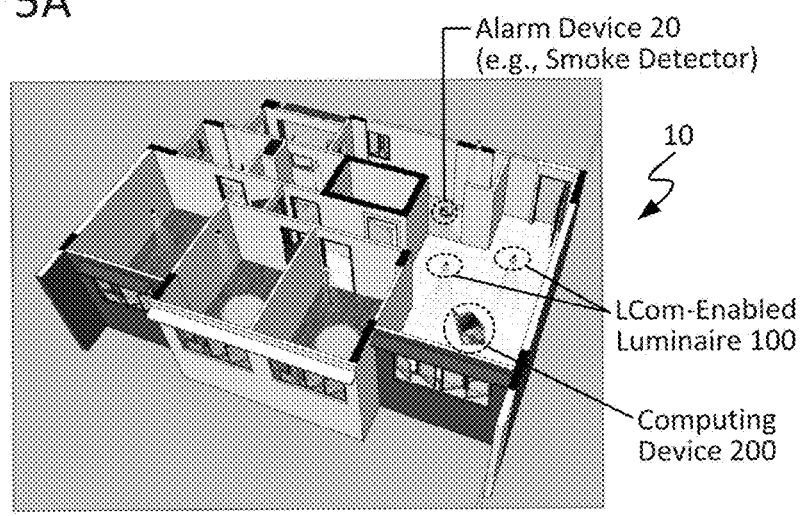
FIGS. 5A-5B are perspective views illustrating an example network of LCom-enabled luminaires providing indoor navigation with emergency assistance, in accordance with an embodiment of the present disclosure.
Figure 5B:
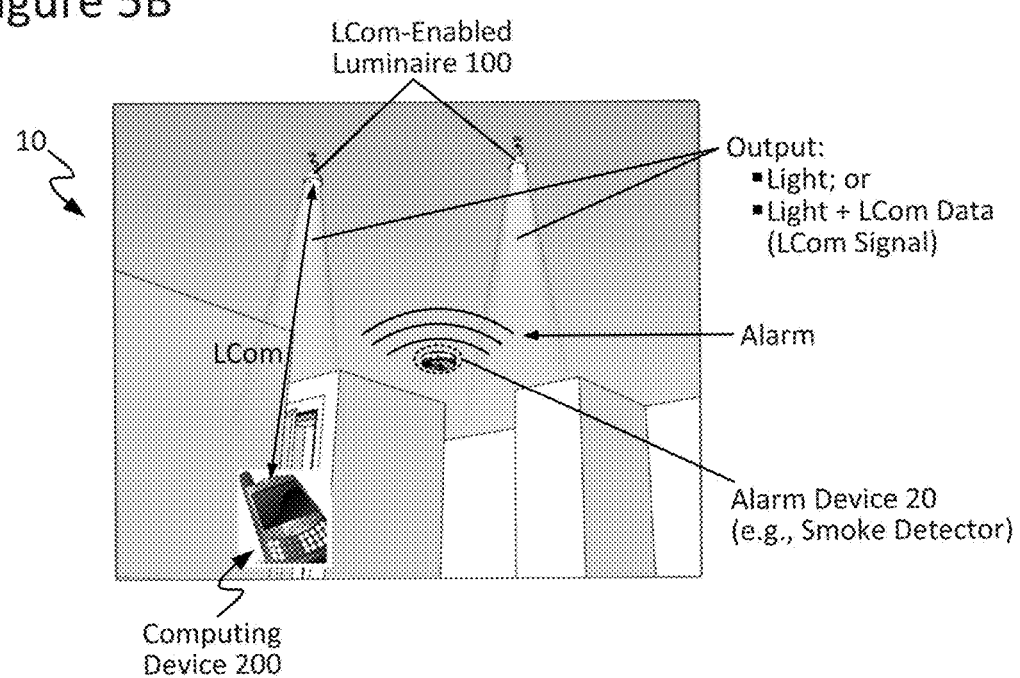

FIGS. 5A-5B are perspective views illustrating an example network 10 of LCom-enabled luminaires 100 providing indoor navigation with emergency assistance, in accordance with an embodiment of the present disclosure. A given LCom-enabled luminaire 100 may be configured, in accordance with some embodiments, to detect output of a given alarm device 20. Alarm device 20 can be any alarm device configured to emit sound (audible alarm or otherwise), light (visible alarm or otherwise), a control signal (wired, wireless, or both), or a combination thereof upon detection of a given stimulus of interest. For example, alarm device 20 may be a smoke detector, a carbon monoxide (CO) detector, a security alarm, a baby monitor, a telephone, or a door bell, among others.

In some instances, sound emitted by alarm device 20 may be detected by an audio input device 190 or other sound-based sensor 160 of LCom-enabled luminaire 100. In an example case, LCom-enabled luminaire 100 may be configured to detect a sound that is comparatively louder than the ambient noise level and thus indicative of an alarm being sounded. In another example case, LCom-enabled luminaire 100 may be configured to detect a particular audio pattern indicative of an alarm being sounded. In another example case, LCom-enabled luminaire 100 may be configured to detect a repeated audio frequency signal indicative of an alarm being sounded.

In some instances, light emitted by alarm device 20 may be detected by an image capture device 180 or other light-based sensor 160 of LCom-enabled luminaire 100. In an example case, LCom-enabled luminaire 100 may be configured to detect light that is comparatively brighter than the ambient light level and thus indicative of an alarm being lit. In another example case, LCom-enabled luminaire 100 may be configured to detect a particular light pattern indicative of an alarm being lit. In another example case, LCom-enabled luminaire 100 may be configured to detect a repeated frequency signal indicative of an alarm being lit.

In some instances, an RF, IR, or other control signal output by alarm device 20 may be detected by a communication module 170 or other suitable sensor 160 of LCom-enabled luminaire 100. As discussed above, communication module 170 may be configured for wired or wireless communication (or both) using any of a wide range of communications means (e.g., RF, IR, etc.). Other suitable means for detection of the output of a given alarm device 20 by LCom-enabled luminaire 100 will depend on a given application and will be apparent in light of this disclosure.

As discussed above, LCom-enabled luminaire 100 may include one or more solid-state light sources 110 configured to output visible light. In accordance with some embodiments, in response to detecting the output of a given alarm device 20, LCom-enabled luminaire 100 may adjust the visible light output of a given solid-state light source 110. In an example case, LCom-enabled luminaire 100 may turn its output on/off in an emergency flashing pattern at a rate in the range of about 0.1-5 Hz (e.g., about 0.1-1 Hz, about 1-2 Hz, about 2-5 Hz, or any other sub-range in the range of about 0.1-5 Hz). Faster and slower adjustment rates may be provided, as desired for a given target application or end-use. Adjustment of the output of LCom-enabled luminaire 100 may be adjusted immediately or after a period of delay, which may be customized as desired for a given target application or end-use. As will be appreciated in light of this disclosure, such indoor navigation may be utilized, for example, to assist a bystander that is disoriented, in an unfamiliar building, has a hearing disability, or has difficulty seeing (e.g., because of smoke or otherwise impeded vision). As will be further appreciated, the light output of LCom-enabled luminaire 100 also may be pulsing at a faster rate, for example, to initiate LCom with any nearby computing device 200, in accordance with some embodiments.

In this manner, the visible light output of LCom-enabled luminaire 100 may serve as a visual indicator that alerts bystanders of the detection of a hazardous condition by alarm device 20. Thus, in a general sense, the LCom-enabled luminaire 100 may be utilized in the detection and alert of the presence of a given stimulus of interest (e.g., smoke, carbon monoxide, etc.). In some cases, the visible light output of LCom-enabled luminaire 100 may serve as an emergency beacon for emergency evacuation routing to an exit or other safe location or other indoor navigation.

As discussed above, LCom-enabled luminaire 100 may be configured to output visible light encoded with data (e.g., an LCom signal). In accordance with some embodiments, in response to detecting the output of a given alarm device 20, LCom-enabled luminaire 100 may output one or more LCom signals. In accordance with some embodiments, computing device 200 may be configured to utilize data in a received LCom signal for emergency evacuation routing or other indoor navigation, making an emergency phone call or other emergency communication, or both. In this manner, the alarm device 20 may be effectively linked to computing device 200.

In an example case, LCom-enabled luminaire 100 may output an LCom signal that includes data (e.g., a bit pattern) pertaining to emergency evacuation routing or other indoor navigation. If the transmitting LCom-enabled luminaire 100 has data pertaining to its location, then the LCom signal transmitted thereby may include its coordinates in space, in an example case. A computing device 200 that receives such an LCom signal can utilize those coordinates, for example, for emergency evacuation routing or other indoor navigation. In some cases, LCom data received by computing device 200 may be utilized by an application 232 included with or otherwise accessible thereto. In some instances, computing device 200 may have include or otherwise access to data pertaining to the details of a building map, which it may combine with data received via an LCom signal to provide emergency evacuation routing or other indoor navigation.

In accordance with some embodiments, LCom-enabled luminaire 100 may output an LCom signal that includes a command that, when detected and decoded by a computing device 200, causes that computing device 200 to automatically initiate communication (electronic or otherwise) to solicit help to address an event indicated in the data of the LCom signal. To that end, computing device 200 may output, for example, a phone call, a text message, an e-mail, or any other form of communication, electronic or otherwise. In some cases, computing device 200 may initiate contact with a first responder or other emergency service provider, such as a police department, a fire department, an emergency medical responder, or a security company, among others. In some cases, computing device 200 may initiate contact with a personal contact, such as a neighbor or a family member (e.g., of a user of the computing device 200), among others.

In some instances, detection and decoding of a transmitted LCom signal may be performed only when computing device 200 is being used for indoor navigation. In some other instances, detection and decoding of a transmitted LCom signal may be performed when computing device 200 periodically pings the environment for the presence of an LCom signal. In some such cases, a given image capture device 280 of computing device 200 may sample the environment for a few frames at a given desired interval. Upon detection of an LCom signal, an application 232 may maintain reading of the LCom signal via image capture device 280 and may output an appropriate emergency command to initiate emergency communication.

Numerous embodiments will be apparent in light of this disclosure. One example embodiment provides a solid-state luminaire including: a processor responsive to at least one of a sensor and an image capture device and configured to: analyze data about a hazardous condition detected by the at least one of a sensor and an image capture device; and output data about an emergency evacuation route that avoids the detected hazardous condition; and a solid-state light source configured to emit a pulsing light signal encoded with the data about the emergency evacuation route. In some cases, the processor is further configured to: analyze the data about the hazardous condition to determine a degree of danger of a given spatial zone along the emergency evacuation route; and output data about the degree of danger of such spatial zone; and the pulsing light signal emitted by the solid-state light source is encoded with such data. In some instances, the processor is further configured to: analyze the data about the hazardous condition to determine whether it is a roadblock to the emergency evacuation route; and output data about such roadblock; and the pulsing light signal emitted by the solid-state light source is encoded with such data. In some cases, the processor is further configured to output data about at least one of a location of the solid-state luminaire, an identification (ID) of the solid-state luminaire, a building map update, an alert, and an advertisement; and the pulsing light signal emitted by the solid-state light source is encoded with such data. In some instances, the processor is further configured to: analyze data received by the solid-state luminaire from at least one of a building management system (BMS), a Wi-Fi positioning system (WPS), and a global positioning system (GPS); and output data about the emergency evacuation route that is based on such data; and the pulsing light signal emitted by the solid-state light source is encoded with the data about the emergency evacuation route and such data. In some cases, the at least one of a sensor and an image capture device is configured to monitor a spatial region to be illuminated by output of the solid-state luminaire. In some instances, the at least one of a sensor and an image capture device is configured to detect at least one of smoke, fire, seismic vibration, and hazardous air quality. In some cases, the at least one of a sensor and an image capture device is configured to perform hazardous condition detection in real time. In some instances, the solid-state luminaire further includes the at least one of a sensor and an image capture device. In some cases, the solid-state luminaire further includes a communication module configured to utilize at least one of a radio frequency (RF) signal, an infrared (IR) signal, a digital multiplexer (DMX) interface protocol, a Wi-Fi protocol, a Bluetooth protocol, a digital addressable lighting interface (DALI) protocol, and a ZigBee protocol in communicating with another solid-state luminaire.

Another example embodiment provides a non-transitory computer program product encoded with instructions that, when executed by one or more processors, causes a process to be carried out, the process including: analyzing a pulsing light signal encoded with data about a hazardous condition detected within a building by at least one of a sensor and an image capture device, the pulsing light signal transmitted by a solid-state luminaire; and computing therefrom an emergency evacuation route through the building that avoids the detected hazardous condition. In some cases, the pulsing light signal is also encoded with data about a degree of danger of a given spatial zone along the emergency evacuation route, and the process further includes: analyzing the pulsing light signal encoded with data about the degree of danger of such spatial zone along the emergency evacuation route; and providing emergency evacuation routing instruction identifying the degree of danger of such spatial zone along the emergency evacuation route. In some instances, the pulsing light signal is also encoded with data about whether the detected hazardous condition is a roadblock to emergency evacuation routing, and the process further includes: analyzing the pulsing light signal encoded with data about such roadblock; and providing emergency evacuation routing instruction that at least one of identifies and avoids such roadblock. In some cases, the pulsing light signal is also encoded with data about at least one of a location of the solid-state luminaire transmitting the pulsing light signal, an identification (ID) of the solid-state luminaire transmitting the pulsing light signal, a building map update, an alert, and an advertisement, and the process further includes: analyzing the pulsing light signal encoded with such data; and outputting emergency evacuation routing instruction based on such data. In some instances, the pulsing light signal is also encoded with data received by the solid-state luminaire from at least one of a building management system (BMS), a Wi-Fi positioning system (WPS), and a global positioning system (GPS), and the process further includes: analyzing the pulsing light signal encoded with such data; and outputting emergency evacuation routing instruction based on such data.

Another example embodiment provides a computing device including: at least one of an ambient light sensor and an image capture device configured to detect a pulsing light signal encoded with data about a hazardous condition detected by at least one of a sensor and an image capture device, the pulsing light signal transmitted by a solid-state luminaire; and a processor responsive to the at least one of an ambient light sensor and an image capture device and configured to: analyze the data about the detected hazardous condition; and compute therefrom an emergency evacuation route that avoids the detected hazardous condition. In some cases, the pulsing light signal is also encoded with data about a degree of danger of a given spatial zone along the emergency evacuation route; and the processor is further configured to: analyze the data about the degree of danger of such spatial zone along the emergency evacuation route; and provide emergency evacuation routing instruction identifying the degree of danger of such spatial zone along the emergency evacuation route. In some instances, the pulsing light signal is also encoded with data about whether the detected hazardous condition is a roadblock to emergency evacuation routing; and the processor is further configured to: analyze the data about such roadblock; and provide emergency evacuation routing instruction that at least one of identifies and avoids such roadblock. In some cases, the pulsing light signal is also encoded with data about at least one of a location of the solid-state luminaire transmitting the pulsing light signal, an identification (ID) of the solid-state luminaire transmitting the pulsing light signal, a building map update, an alert, and an advertisement; and the processor is further configured to: analyze such data; and output emergency evacuation routing instruction based on such data. In some instances, the pulsing light signal is also encoded with data received by the solid-state luminaire from at least one of a building management system (BMS), a Wi-Fi positioning system (WPS), and a global positioning system (GPS); and the processor is further configured to: analyze such data; and output emergency evacuation routing instruction based on such data.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future-filed applications claiming priority to this application may claim the disclosed subject matter in a different manner and generally may include any set of one or more limitations as variously disclosed or otherwise demonstrated herein.

What is claimed is:

1. A solid-state luminaire comprising:
   a processor responsive to at least one of a sensor and an image capture device and configured to:
      analyze data about a hazardous condition detected by the at least one of the sensor and the image capture device to determine an emergency evacuation route and a degree of danger of a given spatial zone along the emergency evacuation route; and
      output data about the emergency evacuation route that avoids the detected hazardous condition and the degree of danger of the given spatial zone; and
   a solid-state light source configured to emit a pulsing light signal encoded with the data about the emergency evacuation route and the degree of danger of the given spatial zone.

2. The solid-state luminaire of claim 1, wherein:
   the processor is further configured to:
      analyze the data about the hazardous condition to determine whether it is a roadblock to the emergency evacuation route; and
      output data about such roadblock; and
   the pulsing light signal emitted by the solid-state light source is encoded with such data.

3. The solid-state luminaire of claim 1, wherein:
   the processor is further configured to output data about at least one of a location of the solid-state luminaire, an identification (ID) of the solid-state luminaire, a building map update, an alert, and an advertisement; and
   the pulsing light signal emitted by the solid-state light source is encoded with such data.

4. The solid-state luminaire of claim 1, wherein:
   the processor is further configured to:
      analyze data received by the solid-state luminaire from at least one of a building management system (BMS), a Wi-Fi positioning system (WPS), and a global positioning system (GPS); and
      output data about the emergency evacuation route that is based on such data; and
   the pulsing light signal emitted by the solid-state light source is encoded with the data about the emergency evacuation route and such data.

5. The solid-state luminaire of claim 1, wherein the at least one of the sensor and the image capture device is configured to monitor a spatial region to be illuminated by output of the solid-state luminaire.

6. The solid-state luminaire of claim 1, wherein the at least one of the sensor and the image capture device is configured to detect at least one of smoke, fire, seismic vibration, and hazardous air quality.

7. The solid-state luminaire of claim 1, wherein the at least one of the sensor and the image capture device is configured to perform hazardous condition detection in real time.

8. The solid-state luminaire of claim 1 further comprising the at least one of the sensor and the image capture device.

9. The solid-state luminaire of claim 1 further comprising a communication module configured to utilize at least one of a radio frequency (RF) signal, an infrared (IR) signal, a digital multiplexer (DMX) interface protocol, a Wi-Fi protocol, a Bluetooth protocol, a digital addressable lighting interface (DALI) protocol, and a ZigBee protocol in communicating with another solid-state luminaire.

10. A non-transitory computer program product encoded with instructions that, when executed by one or more processors on a computing device, causes a process to be carried out, the process comprising:
   analyzing a pulsing light signal encoded with data about a hazardous condition detected within a building and received by at least one of an ambient light sensor and an image capture device on the computing device, the pulsing light signal transmitted by a solid-state luminaire;
   computing therefrom an emergency evacuation route through the building that avoids the detected hazardous condition;
   analyzing the pulsing light signal, which is further encoded with data about a degree of danger of a given spatial zone along the emergency evacuation route; and
   providing emergency evacuation routing instructions identifying the degree of danger of the given spatial zone along the emergency evacuation route.

11. The non-transitory computer program product of claim 10, wherein the pulsing light signal is also encoded with data about whether the detected hazardous condition is a roadblock to emergency evacuation routing, and wherein the process further comprises:
   analyzing the pulsing light signal encoded with data about such roadblock; and
   providing emergency evacuation routing instructions that at least one of identifies and avoids such roadblock.

12. The non-transitory computer program product of claim 10, wherein the pulsing light signal is also encoded with data about at least one of a location of the solid-state luminaire transmitting the pulsing light signal, an identification (ID) of the solid-state luminaire transmitting the pulsing light signal, a building map update, an alert, and an advertisement, and wherein the process further comprises:
   analyzing the pulsing light signal encoded with such data; and
   outputting emergency evacuation routing instructions based on such data.

13. The non-transitory computer program product of claim 10, wherein the pulsing light signal is also encoded with data received by the solid-state luminaire from at least one of a building management system (BMS), a Wi-Fi positioning system (WPS), and a global positioning system (GPS), and wherein the process further comprises:
 analyzing the pulsing light signal encoded with such data; and
 outputting emergency evacuation routing instructions based on such data.

14. A computing device comprising:
 at least one of an ambient light sensor and an image capture device configured to detect and decode a pulsing light signal encoded with data about a hazardous condition detected by at least one of a sensor and an image capture device, the pulsing light signal transmitted by a solid-state luminaire; and
 a processor responsive to the at least one of the ambient light sensor and the image capture device and configured to:
  analyze the data about the detected hazardous condition;
  compute therefrom an emergency evacuation route that avoids the detected hazardous condition;
  analyze the pulsing light signal, which is further encoded with data about a degree of danger of a given spatial zone along the emergency evacuation route; and
  provide emergency evacuation routing instructions identifying the degree of danger of such spatial zone along the emergency evacuation route.

15. The computing device of claim 14, wherein:
 the pulsing light signal is also encoded with data about whether the detected hazardous condition is a roadblock to emergency evacuation routing; and
 the processor is further configured to:
  analyze the data about such roadblock; and
  provide emergency evacuation routing instructions that at least one of identifies and avoids such roadblock.

16. The computing device of claim 14, wherein:
 the pulsing light signal is also encoded with data about at least one of a location of the solid-state luminaire transmitting the pulsing light signal, an identification (ID) of the solid-state luminaire transmitting the pulsing light signal, a building map update, an alert, and an advertisement; and
 the processor is further configured to:
  analyze such data; and
  output emergency evacuation routing instructions based on such data.

17. The computing device of claim 14, wherein:
 the pulsing light signal is also encoded with data received by the solid-state luminaire from at least one of a building management system (BMS), a Wi-Fi positioning system (WPS), and a global positioning system (GPS); and
 the processor is further configured to:
  analyze such data; and
  output emergency evacuation routing instructions based on such data.

* * * * *